US009442763B2

(12) United States Patent
Chai

(10) Patent No.: US 9,442,763 B2
(45) Date of Patent: Sep. 13, 2016

(54) RESOURCE ALLOCATION METHOD AND RESOURCE MANAGEMENT PLATFORM

(71) Applicant: Huawei Technologies Co., Ltd., Shenzhen, Guangdong (CN)

(72) Inventor: Xiaoqian Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 14/184,342

(22) Filed: Feb. 19, 2014

(65) Prior Publication Data

US 2014/0173620 A1 Jun. 19, 2014

Related U.S. Application Data

(63) Continuation of application No. PCT/CN2012/080467, filed on Aug. 22, 2012.

(30) Foreign Application Priority Data

Aug. 29, 2011 (CN) .......................... 2011 1 0251036

(51) Int. Cl.
*G06F 9/50* (2006.01)
(52) U.S. Cl.
CPC ........... *G06F 9/5005* (2013.01); *G06F 9/5027* (2013.01)
(58) Field of Classification Search
None
See application file for complete search history.

(56) References Cited

U.S. PATENT DOCUMENTS

| 7,620,953 B1 * | 11/2009 | Tene .................... G06F 9/5077 709/203 |
| 7,912,955 B1 | 3/2011 | Machiraju et al. |
| 2005/0005018 A1 * | 1/2005 | Datta .................... G06F 9/5016 709/229 |
| 2005/0149940 A1 | 7/2005 | Calinescu et al. |

(Continued)

FOREIGN PATENT DOCUMENTS

| CN | 1713561 A | 12/2005 |
| CN | 101969475 A | 2/2011 |

(Continued)

OTHER PUBLICATIONS

Somani et al., "Application Performance Isolation in Virtualization," IEEE International Conference on Cloud Computing, IEEE Computer Society, pp. 41-48, Institute of Electrical and Electronics Engineers, New York, New York (2009).

*Primary Examiner* — Shih-Wei Kraft
(74) *Attorney, Agent, or Firm* — Leydig, Voit & Mayer, Ltd.

(57) ABSTRACT

The present disclosure is applicable to the technical field of computer technology. Disclosed are a resource allocation method and a resource management platform. The method includes: receiving a resource request sent by a resource requester, where the resource request includes resource demand and application feature of a resource; determining a host machine for allocating resources to the resource requester according to the resource request and a resource application feature allocation policy; and controlling the host machine to allocate resources to the resource requester and return resource allocation information to the resource requester, thus solving the problem of degrading performance of host machines as a whole in the prior art caused by hardware resource competition among a plurality of applications which share hardware resources, and efficiently improving the utilization efficiency of the server resources, reducing hardware loss, and improving the user's experience.

12 Claims, 4 Drawing Sheets

(56) References Cited

U.S. PATENT DOCUMENTS

| | | |
|---|---|---|
| 2005/0288030 A1 | 12/2005 | Choi et al. |
| 2006/0143617 A1* | 6/2006 | Knauerhase .............. G06F 9/50 |
| | | 718/104 |
| 2006/0294238 A1* | 12/2006 | Naik ..................... G06F 9/5072 |
| | | 709/226 |
| 2008/0022285 A1* | 1/2008 | Cherkasova ............ G06F 9/505 |
| | | 718/104 |
| 2009/0183168 A1* | 7/2009 | Uchida ................. G06F 9/5027 |
| | | 718/104 |
| 2010/0319004 A1 | 12/2010 | Hudson et al. |
| 2014/0012995 A1 | 1/2014 | Zhang |

FOREIGN PATENT DOCUMENTS

| | | |
|---|---|---|
| CN | 102004671 A | 4/2011 |
| CN | 102137014 A | 7/2011 |

* cited by examiner

RESOURCE ALLOCATION METHOD AND RESOURCE MANAGEMENT PLATFORM

CROSS-REFERENCE TO RELATED APPLICATIONS

This application is a continuation of International Patent Application No. PCT/CN2012/080467, filed on Aug. 22, 2012, which claims priority to Chinese Patent Application No. 201110251036.3, filed on Aug. 29, 2011, both of which are hereby incorporated by reference in their entireties.

TECHNICAL FIELD

The present disclosure relates to the field of computer technology, and particularly, to a resource allocation method and a resource management platform.

BACKGROUND

Cloud computing can perform an on-demand allocation according to the user's resource demand, i.e., the resources are allocated when being required by the service, and released when being not required. In a case where there are multiple peak-alternation services, the utilization efficiencies of various parts of the system can be improved on the whole. This feature of cloud computing effectively reduces the hardware and management costs for enterprise operation, increases the utilization rate of hardware resources, and greatly improves the cloud computing technology.

As one of the most common resource allocation modes, a Virtual Machine (VM) architecture provides services to multiple users in the same computer hardware through virtualization of hardware resources, thereby increasing the utilization rate of hardware resources. When a user requests resources of a certain capacity, the user may apply a resource management platform through an exposed interface thereof for the resources. When applying for the resources, the user provides a resource capacity demand parameter which includes VM CPU (central processing unit), memory, hard disk, network capacity, VM position requirement, VM image, etc. The demand parameter mainly refers to parameter requirement of some technical performances that the resource management platform shall satisfy, so that the resource management platform provides resources to the user according to the user's demand parameter. In the prior art, VMs on the same host machine are isolated from each other in a certain extent, and the isolation degree varies with the virtualization technology. The isolation mainly refers to mutual influence among the VMs. If an application running on one VM enters an endless loop, the VM may crash, but the running of other VM will not be influenced. The host machine in the present disclosure refers to a machine for VM running, and it may be a physical machine or a VM.

However, as the VMs share the hardware resources, the feature limitation of the hardware resources makes competition for the hardware resources exist among the VMs, e.g., for hard disk read/write, multiple VMs commonly and frequently read/write the hard disk will influence each other due to the limitation of the rotational and read-write speed of the hard disk. In a case where one physical machine has two or more VMs, the applications running on respective VMs may compete for resources, so that the performance of each VM cannot be ensured, and the physical machine cannot exert its optimal performance. For example, one physical machine has two VMs, and the applications running thereon both frequently read and write the hard disk, such as using the hard disk to cache the processed data, or copying and modifying the data of the hard disk. In that case, the applications on the two VMs will cause the competition for using the hardware resources between the VMs, thereby degrading the overall performance of the physical machine where the VMs are located. Currently, the physical resources of Infrastructure as a Service (IaaS) are shared by multiple users, and the users cannot know which application shares the same physical resources as which they apply for, thus cannot avoid the competition for the hardware resources among the VMs. In addition, since the resource management module is unable to acquire the features of the application going to run on the allocated VM, it also cannot avoid the competition for the hardware resources, thereby cannot prevent the degradation of the VM performance caused by the competition. Moreover, if multiple VMs having homogeneous demands on the hardware resources (i.e., the VMs have same or similar demands on the hardware resources, e.g., the two VMs both frequently read and write the hard disk) are arranged on the same physical machine, during the long-term running, a certain hardware of the physical machine will be in a high load state while other hardware will be in a low load state, thus the overall performance of the physical machine cannot be exerted uniformly, and the energy consumption and the hardware loss will be increased.

SUMMARY

The object of the embodiments of the present disclosure is to provide a resource allocation method, so as to solve the problem that the performance of the host machine is degraded as a whole due to the hardware resource competition among a plurality of applications which share hardware resources.

One embodiment of the present disclosure is implemented by a resource allocation method, comprising the steps of:

receiving a resource request sent by a resource requester, wherein the resource request comprises resource demand and an application feature of a resource;

determining a host machine for allocating resources to the resource requester according to the resource request and a resource application feature allocation policy; and controlling the host machine to allocate resources to the resource requester and returning resource allocation information to the resource requester.

Another object of the embodiment of the present disclosure is to provide a resource management platform, comprising:

a resource request receiving unit configured to receive a resource request sent by a resource requester, wherein the resource request comprises resource demand and an application feature of a resource;

a host machine determining unit configured to determine a host machine for allocating resources to the resource requester according to the resource request and a resource application feature allocation policy; and an allocation information returning unit configured to control the host machine to allocate resources to the resource requester and return resource allocation information to the resource requester.

The embodiment of the present disclosure receives from the resource requester a resource request including resource demand and application feature of a resource, determines a host machine for allocating resources to the resource requester according to the resource request and a preset resource application feature allocation policy, controls the host machine to allocate resources to the resource requester, and returns resource allocation information to the resource requester. The embodiment of the present disclosure determines the host machine for allocating resources with reference to the application feature of the resource and the resource application feature allocation policy, thereby solving the problem that the performances of the host machine and the allocated resource itself are degraded due to the hardware resource competition among a plurality of applications which share hardware resources. Thus the resources are allocated according to the resource request and resource application feature allocation policy, which optimizes the resource allocation, effectively increases the resource utilization efficiency, reduces the hardware loss and improves the user's experience.

DESCRIPTION OF EMBODIMENTS

In order to make the objects, technical solutions and advantages of the present disclosure clearer, the present disclosure will be further described in detail as follows in conjunction with the embodiments and the drawings. It shall be appreciated that the embodiments described herein are just examples of the present disclosure rather than limitations thereto.

Next, the implementations of the present disclosure will be described in detail in conjunction with the embodiments.

Embodiment 1

Figure 1:
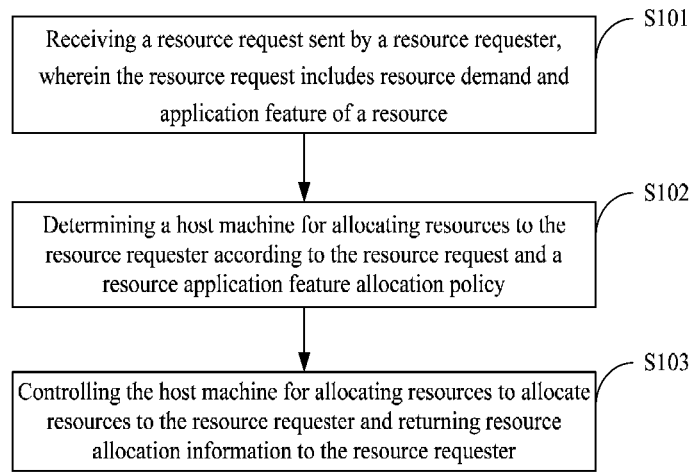
FIG. 1 is a flowchart for implementing a resource allocation method provided by Embodiment 1 of the present disclosure.

FIG. 1 illustrates a flowchart for implementing a resource allocation method provided by Embodiment 1 of the present disclosure, and the details are described as follows.

In step S101, receiving a resource request sent by a resource requester, wherein the resource request includes resource demand and application feature of a resource.

In the embodiment of the present disclosure, the resource request may be received through a preset interface, so that the interface can receive the application feature of the resource. The preset interface may be a Representational State Transfer (RESTful) interface, a Web Service (WebService) interface or a remote-called interface. The resource mainly refers to a Virtual Machine (VM) having a Central Processing Unit (CPU), a memory, a hard disk, a network, etc., or a resource having computation capability, such as a Java Virtual Machine (JVM) running on a certain operating system or a computation agent. The resource request is initiated by a resource requester. During the implementation process, the resource requester may be any user who requests a resource from the resource management platform. Of course, the resource requester also includes programs such as a scheduling module of a distributed computing system.

In the embodiment of the present disclosure, the resource demand included in the resource request refers to the performance parameter requirement of the resource requested by the user, i.e., some capacity requirements to be satisfied by the provided resource, and herein called as resource specification. For example, when the requested resource is a VM, the resource specification may be one or arbitrary combinations of a position of a host machine where the resource is located, a VM CPU, a memory, a magnetic disk, a network, an operating system and an application, wherein the position of the host machine where the resource is located may designate the position of the host machine, or the requirements of the position (e.g., the resources applied for are located in the same host machine), and the detailed example is shown in Table 1.

TABLE 1

| Resource Demand Specification | Value |
| --- | --- |
| CPU | 2 cores 3.0 GHz |
| Memory | 4 G |
| Hard disk | 160 G |
| Network | 1,000 Mbps |
| Operating system | Linux |

Table 1 lists the resource demands in a resource request: a CPU with two cores, a frequency of 3.0 GHz (gigahertz), a memory of 4 G (gigabytes), a hard disk of 160 G (gigabytes), etc.

In the embodiment of the present disclosure, the application feature of the resource refers to the type of an application running on the resource, which may be pre-defined by the resource provider. From the types of the applications running on the resource defined by the resource provider, the resource requester selects a type most fitting the program to be run as the application feature of the resource applied for. Or, the application feature of the resource refers to the usage condition of the resource to be applied for by the resource requester. The usage condition includes, but not limited to, one or arbitrary combinations of a CPU usage rate, a memory usage rate, a magnetic disk read-write, network throughput (uplink and downlink), a highly real-time, a Graphic Processing Unit (Graphic Processing Unit, GPU) usage rate, etc. The usage condition defines the load usage conditions of various capacities of the resource, and it is an integration of the features of all the applications running on the resource applied for. For example, if on a certain VM, there runs an application that reads and writes frequently from and into the hard disk, then the VM represents frequent hard disk read-write, i.e., the application feature of the resource is frequent hard disk read-write. For another example, if two applications run on a certain VM, wherein one application is a high network load and the other application does not have any high occupancy rate of the hardware resources, then the comprehensive representation of the two applications is a high network load, i.e., the application feature of the resource is the high network load. The detailed example is shown in Table 2.

TABLE 2

| Application Feature of Resource | Feature |
|---|---|
| CPU | High (>75%) |
| Memory | Low |
| Magnetic disk read-write | Low |
| Network throughput | Low |
| Real-time | Low |
| GPU | High |

Table 2 depicts the application feature of a resource in a resource request, wherein the CPU usage rate is high (>75%), while the memory, the magnetic disk read-write, the network throughput and the real-time are low. The application feature may be specifically defined upon the system demand, e.g., if the memory usage rate<10%, the application feature of the memory is defined as low.

In step S102, determining a host machine for allocating resources to the resource requester according to the resource request and a resource application feature allocation policy.

In the present disclosure, the resource application feature allocation policy may be preconfigured on the resource management platform. The resource management platform determines the host machine for allocating resources to the user according to the resource demand, the application feature of the resource and the resource application feature allocation policy. In which, the resource application feature allocation policy may specifically include one or arbitrary combinations of a resource application feature allocation policy based on region allocation, a resource application feature allocation policy based on host machine allocation and a resource application feature allocation policy based on a resource application feature combination policy. In which, the resource application feature allocation policy based on region allocation indicates the region(s) where the resource of a certain application feature is allocated, and the resource application feature allocation policy based on host machine allocation indicates the host machine(s) where the resource of a certain application feature is allocated. The region refers to a logic region or a physical region, wherein the logic region logically sorts one or more physical resources into one group to be managed with the same management rule or security policy. The resource application feature combination policy is used for defining the application features of the resources capable or incapable of sharing the host machine, or a degree of mutual influence between the resources of two application features which share the same host machine, i.e., a coexistence degree. In which, the application features of the resources capable of sharing the host machine indicate the application features of which the resources can share the host machine, and the application features of the resources incapable of sharing the host machine indicate the application features of which the resources cannot share the host machine. During the implementation process, a rule file may be used to store the resource application feature combination policy. As shown in Table 3, the configured resource application feature combination policy is described through an example.

TABLE 3

| Type of Resource 1 | Type of Resource 2 | Coexistence Degree |
|---|---|---|
| High magnetic disk read-write | High magnetic disk read-write | 0 |
| High network access | High network access | 1 |
| High CPU usage | High CPU usage | 2 |

Table 3 depicts degrees of influences on the resource performance when resources 1 and 2 of different types share the host machine, which are represented as coexistence degrees, and the influence factors are classified into three levels. In the second row, the coexistence degree between resource 1 of high magnetic disk read-write type and resource 2 of high magnetic disk read-write type sharing the host machine is 0, i.e., the coexistence degree is low and coexistence is not recommended. In the third row, the coexistence degree between resource 1 of high network access type and resource 2 of high network access type sharing the host machine is 1, which means that the influence is medium, the coexistence degree is secondarily high, and coexistence is allowed in a certain extent. In the fourth row, the coexistence degree between resource 1 of high CPU usage type and resource 2 of high network access type sharing the host machine is 2, which means that the influence is little, the coexistence degree is high, and coexistence is allowed.

In step S103, controlling the host machine for allocating resources to allocate resources to the resource requester and returning resource allocation information to the resource requester.

In the embodiment of the present disclosure, after the host machine for allocating resources to the resource requester is determined, the host machine is controlled to allocate resources to the resource requester and return resource allocation information to the resource requester, wherein the resource allocation information may be an identifier of the resource and/or an address of the resource and/or any other information capable of locating or identifying the resource.

After the resources are successfully allocated to the resource requester, information related to the allocated resource is further stored as a basis for subsequent resource allocation or resource adjustment, wherein the resource adjustment may be a resource migration. The stored information related to the resource includes the application feature of the resource, and may further include one or more of a resource position, a resource user, a resource allocation time, a resource valid period, a resource capacity, a resource security policy, a resource migration policy, etc.

The embodiment of the present disclosure receives a resource request including resource demand and application feature of a resource through a RESTful interface, a Web-Service interface or a remote-called interface, determines a host machine for allocating resources to the resource requester according to a resource application feature allocation policy preset by a resource management platform, and controls the host machine to allocate resources to the resource requester, so as to optimize the resource allocation according to the application feature of the requested resource and a configured resource application feature combination policy before resource allocation, which effectively improves the resource utilization efficiency and the user experience.

Embodiment 2

Figure 2:
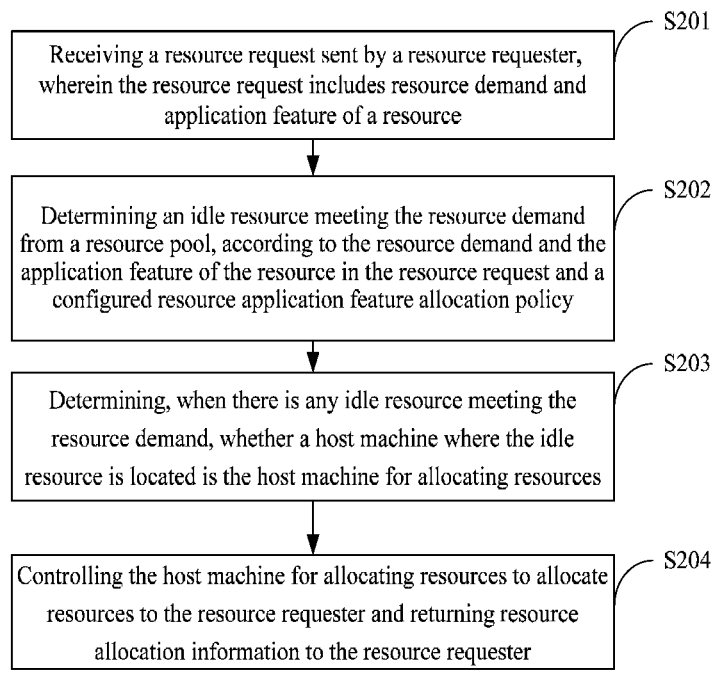
FIG. 2 is a flowchart for implementing a resource allocation method provided by Embodiment 2 of the present disclosure.

FIG. 2 illustrates a flowchart for implementing a resource allocation method provided by Embodiment 2 of the present disclosure, and the details are described as follows.

In step S201, receiving a resource request sent by a resource requester, wherein the resource request includes resource demand and application feature of a resource.

In step S202, determining an idle resource meeting the resource demand from a resource pool, according to the resource demand and the application feature of the resource in the resource request and a configured resource application feature allocation policy.

In the embodiment of the present disclosure, after receiving the resource request sent by the resource requester, a resource management platform determines whether there is an idle resource meeting the resource request according to the resource demand carried in the resource request and idle resources in the resource pool, and if yes, performs step S203 for the idle resource. Herein the 'meeting the resource request' specifically means that if the resource demand is less than the number of idle resources in the current resource pool and the maximum individual resource available in that resource pool meets the maximum individual resource demand in the resource demand, it is deemed that the demand of the resource requester is met, otherwise the demand is not met. For example, since one VM must be located in a single physical machine, if the VM specification demands 16-core CPU and 16 G memory while the specification of the maximum individual physical resource in the resource pool is configured as 8-core CPU and 8 G memory, the VM specification demand is larger than the specification configuration of any physical machine in the resource pool, and it is deemed that the resource cannot meet the resource demand of the resource request, wherein being located in the single physical machine means that cross-physical machine is not allowed, and the individual resource refers to a resource that cannot be divided anymore, such as a single server.

During the implementation process, when the resource demand in the resource request has a region requirement, or a resource providing region is set in a resource authority control policy preset in the resource pool, or an allocation region is defined by the application feature of the requested resource and the resource application feature allocation policy, locating in a certain search algorithm in a corresponding (designated) region according to the resource demand in the resource request and the application feature of the resource, so as to determine the idle resource meeting the resource demand, otherwise locating in all the resource pools to determine the idle resource meeting the resource demand. For example, if the resource demand in the resource request has a region requirement, or the resource authority control policy set by the resource provider limits to providing resources to the resource requester in a certain specific region, or the limitation to a certain region is determined according to the application feature of the resource and the resource application feature allocation policy of the resource provider, locating in the region to determine the idle resource meeting the resource demand, and if there is no region requirement, locating in all the regions to determine the idle resource meeting the resource demand. In which, the resource application feature allocation policy of the resource provider herein defines the resource application feature allocation policy based on region allocation, and/or the resource application feature allocation policy based on host machine allocation, wherein, the region is a logic region or a physical position, and wherein the resource authority control policy set by the resource provider may be one or arbitrary combinations of a policy based on resource requester level, a policy based on category of resource subscribed by the resource requester, an allocation policy of a group where the account of the resource requester is located, a region policy of the resource provider (e.g., determining the position of the requester according to the IP of the requester), a resource failure response policy, national laws limitations, or other policies of the resource provider.

In step S203, determining, when there is any idle resource meeting the resource demand, whether a host machine where the idle resource is located is the host machine for allocating resources.

In the embodiment of the present disclosure, if the resource application feature combination policy is not pre-defined in the resource application feature allocation policy, directly determining that the host machine where the idle resource is located is the host machine for allocating resources to the resource requester; and if the resource application feature combination policy is pre-defined in the resource application feature allocation policy, determining whether the host machine where the idle resource is located is the host machine for allocating resources according to the application feature of the allocated resource in the host machine where the idle resource is located, the application feature of the resource in the resource request and the resource application feature combination policy.

As a preferred embodiment, after an idle resource is determined, determining whether there is any other allocated resource in the host machine where the idle resource is located; if yes, judging whether the application feature of the allocated resource can coexist with the application feature of the resource in the resource request according to the configured resource application feature combination policy; if yes, determining that the host machine where the idle resource is located is the host machine for allocating resources to the resource requester, and performing step S204, otherwise performing step S202 to search for a next idle resource.

During the implementation process, if the resource application feature combination policy defines the application features of the resources capable or incapable of sharing the host machine, judging whether the application feature of the allocated resource can coexist with the application feature of the resource in the resource request according to the resource application feature combination policy directly, and if the resource application feature combination policy defines a coexistence degree of the application features of the resources, judging whether coexistence is allowed according to the level of the coexistence degree of the resources. Specifically, resources of higher coexistence degrees may be selected in an order from high to low based on the coexistence degrees and then allocated to the user, including the steps of:

1) in the resource in the located region, searching for an available host machine as a standby host machine according to a resource search algorithm of the resource management platform, herein the resource search algorithm may be a resource search algorithm balancing the loads of respective host machines or a resource search algorithm using the resources intensively (so as to turn off resources not used and save energy);

2) after finding a standby host machine which can allocate the requested resource, determining whether some resources in the standby host machine have been allocated, and if yes, performing step 3), otherwise performing step 4);

3) acquiring the application feature of the allocated resource, and determining whether the resource having been allocated can coexist with the resource to be allocated in the host machine, according to the configured resource application feature combination policy and the application feature of the resource in the resource request (judging according to coexistence degree of the configured resource application feature combination policy, and firstly selecting the currently available one having the highest coexistence degree), and if yes, performing step 4), otherwise performing step 5);

4) allocating the requested resource to the resource request in the host machine;

5) repeating steps 1)~4) until the resource allocation is completed, or if the resource allocation cannot be completed after all available host machines are searched, performing step 3) for the standby host machine found in step 2) to reduce the requirement of the coexistence degree, i.e., the coexistence degree between the application feature of the allocated resource and the application feature of the resource in the resource request is secondarily high, and if an appropriate resource still cannot be found, further performing step 3) for the standby host machine found in step 2) to reduce the requirement of the coexistence degree, and so on. That is, searching in an order from high to low based on the coexistence degrees, until a resource meeting the resource request is found and allocated, thereby avoiding the resource competition, achieving the optimal resource allocation and improving the allocation efficiency and usage efficiency of the resources.

In step S204, controlling the host machine for allocating resources to allocate resources to the resource requester and returning resource allocation information to the resource requester.

In the embodiment of the present disclosure, information related to the allocated resource is further stored as a basis for subsequent resource allocation or resource adjustment (e.g., migration). The stored information related to the resource includes the application feature of the resource, and may further include one or more of a resource position, a resource user, a resource allocation time, a resource valid period, a resource capacity, a resource security policy, a resource migration policy, etc.

Embodiment 3

In the embodiment of the present disclosure, as the resource demand and the application feature of the resource inputted by the user may have some errors or they are just inputted in a system default mode, or there is no more preferable standby host machine when the resource is allocated to the user, the host machine where the resource allocated to the user is located is not the optimal, wherein 'inputted in a system default mode' means that the user himself does not input. In order to allocate more preferable resource to the user as far as possible, the resource management platform adds a collection function to the application feature of the resource, so as to determine whether the resource shall be adjusted, wherein the collection function of the application feature of the resource refers to an application feature computed by the resource management platform according to the monitoring information in the running process.

Figure 3:
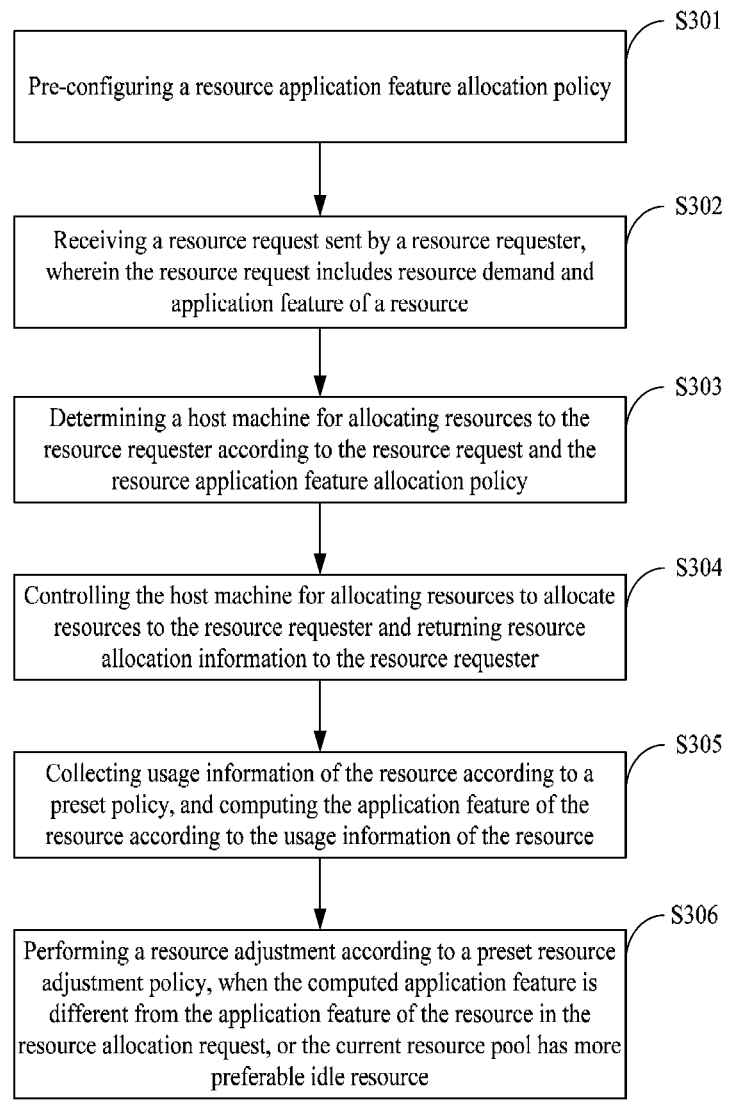
FIG. 3 is a flowchart for implementing a resource allocation method provided by Embodiment 3 of the present disclosure.

FIG. 3 illustrates a flowchart for implementing a resource allocation method provided by Embodiment 3 of the present disclosure, and the details are described as follows.

In step S301, pre-configuring a resource application feature allocation policy.

In the embodiment of the present disclosure, the resource application feature allocation policy specifically include one or arbitrary combinations of a resource application feature allocation policy based on region allocation, a resource application feature allocation policy based on host machine allocation and a resource application feature allocation policy based on a resource application feature combination policy. In which, the resource application feature allocation policy based on region allocation indicates the region(s) where the resource of a certain application feature is allocated, and the resource application feature allocation policy based on host machine allocation indicates the host machine(s) where the resource of a certain application feature is allocated. The region refers to a logic region or a physical region, wherein the logic region logically sorts one or more physical resources into one group to be managed with the same management rule or security policy.

In step S302, receiving a resource request sent by a resource requester, wherein the resource request includes resource demand and application feature of a resource.

In step S303, determining a host machine for allocating resources to the resource requester according to the resource request and the resource application feature allocation policy.

In step S304, controlling the host machine for allocating resources to allocate resources to the resource requester and returning resource allocation information to the resource requester.

In step S305, collecting usage information of the resource according to a preset policy, and computing the application feature of the resource according to the usage information of the resource.

In the embodiment of the present disclosure, as the resource demand and the application feature of the resource inputted by the user may have some errors or they are just inputted in a system default mode, or there is no more preferable standby host machine when the resource is allocated to the user, the host machine where the resource allocated to the user is located is not the optimal. Thus, the usage information of the resource is collected according to the preset policy, and the application feature of the resource is computed according to the usage information of the resource, so as to acquire the actual application feature of the resource at present, wherein the usage information of the resource may be hardware usage information. In the implementation process, the method for computing the application feature of the resource may be as follows: if it is concluded that the load is more than 75% in 80% of the time by analyzing the collected usage information of the resource, the application feature of the resource is high CPU usage, and herein the CPU is taken as an example. If the magnetic disk read-write is taken as an example, and the hard disk read-write time occupies more than 60% in 80% of the time, or an average number of bytes read and written in the hard disk per hour exceeds a threshold, the application feature of the resource is high hard disk read-write. If the network throughput is taken as an example, and an average amount of uplink or downlink data in the network per hour exceeds a threshold, the application feature of the resource is high network throughput. Similarly, other index values can also be obtained.

In the embodiment of the present disclosure, the preset policy may be periodically reporting the source, or acquiring by the resource management platform periodically, and herein are not limited.

In step S306, performing a resource adjustment according to a preset resource adjustment policy, when the computed application feature is different from the application feature of the resource in the resource allocation request, or the current resource pool has more preferable idle resource.

In the embodiment of the present disclosure, when a resource adjustment triggering condition based on the resource application feature allocation policy is satisfied, the resource adjustment is performed according to the preset resource adjustment policy, wherein 'when a resource adjustment triggering condition based on the resource application feature allocation policy is satisfied' means that the computed application feature is different from the application feature of the resource in the resource allocation request, or the current resource pool has more preferable idle resource. The resource adjustment includes a resource migration and a resource specification adjustment, wherein the resource specification adjustment may be increase and decrease of the memory. In the embodiment of the present disclosure, the resource adjustment policy shall be preset, including one or combinations of a policy for judging whether a migration is allowed, a policy for determining a resource to be migrated, a policy for selecting a target host machine, etc., wherein the policy for determining the resource to be migrated may determine which resource shall be migrated when multiple resources are conflicted with each other. During the implementation process, if the migration is taken as an example, it shall be determined whether a resource migration can be made by further combining other information of the resource management platform. If the migration can be made, the resource to be migrated and the target host machine shall be further determined, and after that, the resource migration can be carried out, wherein other information of the resource management platform for example may indicate whether there is any available target host machine. The resource migration uses corresponding method, for example, when the resource is a VM, using the VM migration technology, and when the resource is a computing agent or other resource, using corresponding migration technology, wherein the VM migration technology may be an offline migration technology, an online migration technology and an internal migration technology, etc.

In the embodiment of the present disclosure, in order to effectively improve the resource utilization efficiency, corresponding inspiring mechanism is established after the resource is allocated to the user, and it is determined whether the resource shall be migrated according to the application feature of the resource in the current host machine after receiving migration triggering information, so as to adjust the resource allocation in the host machine in time, thereby improving the resource utilization efficiency in the host machine and decreasing the hardware loss.

A person skilled in the art can appreciate that all or a part of steps of the method of the above embodiment can be implemented by instructing relevant hardware through a program that may be stored in a computer readable storage medium, which may be a ROM/RAM, a magnetic disk or an optical disk.

Embodiment 4

In the embodiment of the present disclosure, when the resources are Java VMs or computing agents, each of the Java VMs or computing agents can provide computation service to one or more jobs. When receiving from the user a computation request (which carries resource demand and application feature of a job), a distributed computing platform (resource management platform) determines a host machine for providing resources according to a configured resource application feature allocation policy, and hence allocates the computation task of the job to the Java VM or computing agent of a host node, thereby completing the job submitted by the user. The detailed resource allocation mode is the same as that described in the steps of Embodiments 1 and 2.

Embodiment 5

Figure 4:
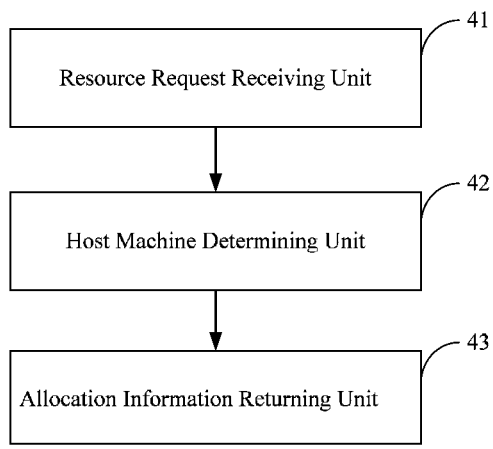
FIG. 4 is a structure diagram of a resource management platform provided by Embodiment 5 of the present disclosure.

FIG. 4 illustrates a structure of a resource allocation platform provided by Embodiment 5 of the present disclosure. For the convenience of description, only the parts related to the embodiment of the present disclosure are illustrated herein.

A resource request receiving unit 41 receives a resource request sent by a resource requester, wherein the resource request includes resource demand and application feature of a resource.

In the embodiment of the present disclosure, the resource request may be received through a preset interface, so that the interface can receive the application feature of the resource. The preset interface may be a RESTful interface, a WebService interface or a remote-called interface. The resource mainly refers to a VM having a CPU, a memory, a hard disk, a network, etc., or a resource having computation capability, such as a Java Virtual Machine (JVM) running on a certain operating system or a computation agent. The resource request is initiated by a resource requester. During the implementation process, the resource requester may be any user who requests a resource from the resource management platform, including programs such as a scheduling module of a distributed computing system.

A host machine determining unit 42 determines a host machine for allocating resources to the resource requester according to the resource request and resource application feature allocation policy.

In the present disclosure, the resource application feature allocation policy shall be preconfigured on the resource management platform. The resource management platform determines the host machine for allocating resources to the user according to the resource demand, the application feature of the resource and the preconfigured resource application feature allocation policy. In which, the resource application feature allocation policy specifically includes one or arbitrary combinations of a resource application feature allocation policy based on region allocation (i.e., indicating the region(s) where the resource of a certain application feature is allocated), a resource application feature allocation policy based on host machine allocation (i.e., indicating the host machine(s) where the resource of a certain application feature is allocated) and a resource application feature allocation policy based on a resource application feature combination policy. In which, the region refers to a logic region or a physical region, wherein the logic region logically sorts one or more physical resources into one group to be managed with the same management rule or security policy. The resource application feature combination policy is used for defining the application features of the resources capable or incapable of sharing the host machine, or a degree of mutual influence between the resources of two application features which share the same host machine, i.e., a coexistence degree. In which, the application features of the resources capable of sharing the host machine indicate the application features of which the resources can share the host machine, and the application features of the resources incapable of sharing the host machine indicate the application features of which the resources cannot share the host machine.

An allocation information returning unit 43 controls the host machine to allocate resources to the resource requester and return resource allocation information to the resource requester.

In the embodiment of the present disclosure, after the host machine for allocating resources to the resource requester is determined, the host machine is controlled to allocate resources to the resource requester and return resource allocation information to the resource requester, wherein the resource allocation information may be an identifier of the resource and/or an address of the resource and/or any other information capable of locating or identifying the resource.

Embodiment 6

Figure 5:
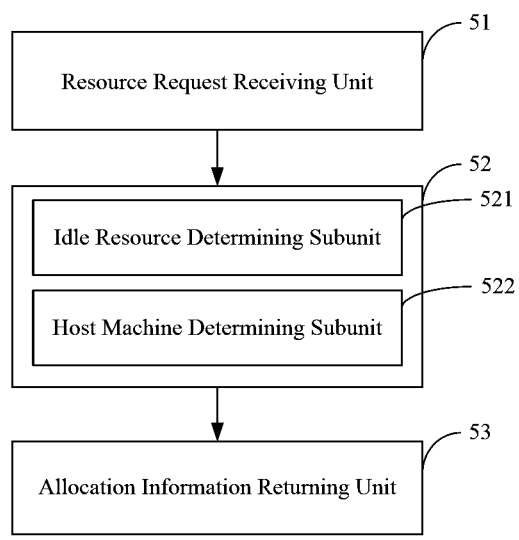
FIG. 5 is a structure diagram of a resource management platform provided by Embodiment 6 of the present disclosure.

FIG. 5 illustrates a structure of a resource allocation platform provided by Embodiment 6 of the present disclosure. For the convenience of description, only the parts related to the embodiment of the present disclosure are illustrated herein.

A resource request receiving unit 51 receives a resource request sent by a resource requester, wherein the resource request includes resource demand and application feature of a resource.

A host machine determining unit 52 determines a host machine for allocating resources to the resource requester according to the resource request and a resource application feature allocation policy.

An allocation information returning unit 53 controls the host machine to allocate resources to the resource requester and return resource allocation information to the resource requester.

In the implementation process, the host machine determining unit 52 specifically may include an idle resource determining subunit 521 and a host machine determining subunit 522, wherein, the idle resource determining subunit 521 is configured to determine an idle resource meeting the resource demand from a resource pool, according to the resource demand and the application feature of the resource in the resource request and a configured resource application feature allocation policy.

In the embodiment of the present disclosure, when the resource demand in the resource request has a region requirement, or a resource providing region is set in a resource authority control policy preset in the resource pool, or an allocation region is defined by the application feature of the requested resource and the resource application feature allocation policy, locating in corresponding region to determine the idle resource meeting the resource demand according to the resource demand in the resource request and the application feature of the resource, otherwise locating in all the resource pools to determine the idle resource meeting the resource demand.

The host machine determining subunit 522 is configured to determine, when there is any idle resource meeting the resource demand, whether a host machine where the idle resource is located is the host machine for allocating resources according to the resource application feature combination policy.

In the embodiment of the present disclosure, after the resource allocation region is determined, if the resource application feature combination policy is not pre-defined in the resource application feature allocation policy, directly determining that the host machine where the idle resource is located is the host machine for allocating resources to the resource requester; and if the resource application feature combination policy is pre-defined in the resource application feature allocation policy, determining whether the host machine where the idle resource is located is the host machine for allocating resources according to the application feature of the allocated resource in the host machine where the idle resource is located, the application feature of the resource in the resource request and the resource application feature combination policy.

In the embodiment of the present disclosure, as a preferred embodiment, after an idle resource is determined, determining whether there is any other allocated resource in the host machine where the idle resource is located; if yes, judging whether the application feature of the allocated resource can coexist with the application feature of the resource in the resource request according to the configured resource application feature combination policy; if yes, determining that the host machine where the idle resource is located is the host machine for allocating resources to the resource requester, and triggering the allocation information returning unit 53, otherwise triggering the idle resource determining subunit 521 to search for a next idle resource.

During the implementation process, if the resource application feature combination policy defines the application features of the resources capable or incapable of sharing the host machine, judging whether the application feature of the allocated resource can coexist with the application feature of the resource in the resource request according to the resource application feature combination policy directly, and if the resource application feature combination policy defines a coexistence degree of the application features of the resources, judging whether coexistence is allowed according to the level of the coexistence degree of the resources. Specifically, resources of higher coexistence degrees may be selected in an order from high to low based on the coexistence degrees and then allocated to the user, including the steps of:

1) in the resource in the located region, searching for an available host machine as a standby host machine according to a resource search algorithm of the resource management platform, herein the resource search algorithm may be a resource search algorithm balancing the loads of respective host machines or a resource search algorithm using the resources intensively (so as to turn off resources not used and save energy);

2) after finding a standby host machine which can allocate the requested resource, determining whether some resources in the standby host machine have been allocated, and if yes, performing step 3), otherwise performing step 4);

3) acquiring the application feature of the allocated resource, and determining whether the resource having been allocated can coexist with the resource to be allocated in the host machine, according to the configured resource application feature combination policy and the application feature of the resource in the resource request (judging according to coexistence degree of the configured resource application feature combination policy, and firstly selecting the currently available one having the highest coexistence degree), and if yes, performing step 4), otherwise performing step 5);

4) allocating the requested resource to the resource request in the host machine;

5) repeating steps 1)~4) until the resource allocation is completed, or if the resource allocation cannot be completed after all available host machines are searched, performing step 3) for the standby host machine found in step 2) to reduce the requirement of the coexistence degree, i.e., the coexistence degree between the application feature of the allocated resource and the application feature of the resource in the resource request is secondarily high, and if an appropriate resource still cannot be found, further performing step 3) for the standby host machine found in step 2) to reduce the requirement of the coexistence degree, and so on. That is, searching in an order from high to low based on the coexistence degrees, until a resource meeting the resource request is found and allocated.

Embodiment 7

Figure 6:
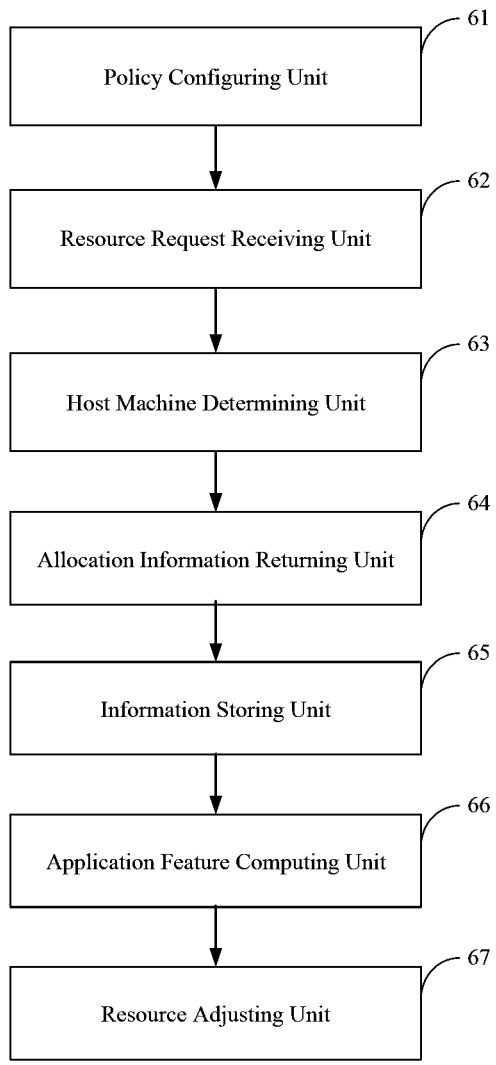
FIG. 6 is a structure diagram of a resource management platform provided by Embodiment 7 of the present disclosure.

FIG. 6 illustrates a structure of a resource allocation platform provided by Embodiment 7 of the present disclosure. For the convenience of description, only the parts related to the embodiment of the present disclosure are illustrated herein.

A policy configuring unit 61 pre-configures a resource application feature allocation policy, which includes one or arbitrary combinations of a resource application feature allocation policy based on region allocation, a resource application feature allocation policy based on host machine allocation and a resource application feature allocation policy based on a resource application feature combination policy.

A resource request receiving unit 62 receives a resource request sent by a resource requester, wherein the resource request includes resource demand and application feature of a resource.

A host machine determining unit 63 determines a host machine for allocating resources to the resource requester according to the resource request and the resource application feature allocation policy.

In the embodiment of the present disclosure, when the resource demand in the resource request has a region requirement, or a resource providing region is set in a resource authority control policy preset in the resource pool, or an allocation region is defined by the application feature of the requested resource and the resource application feature allocation policy, locating in a certain search algorithm in a corresponding (designated) region according to the resource demand in the resource request and the application feature of the resource, so as to determine the idle resource meeting the resource demand, otherwise locating in all the resource pools to determine the idle resource meeting the resource demand.

After the resource allocation region is determined, if the resource application feature combination policy is not pre-defined in the resource application feature allocation policy, directly determining that the host machine where the idle resource is located is the host machine for allocating resources to the resource requester; and if the resource application feature combination policy is pre-defined in the resource application feature allocation policy, determining whether the host machine where the idle resource is located is the host machine for allocating resources according to the application feature of the allocated resource in the host machine where the idle resource is located, the application feature of the resource in the resource request and the resource application feature combination policy.

An allocation information returning unit 64 controls the host machine to allocate resources to the resource requester and return resource allocation information to the resource requester.

An information storing unit 65 stores information related to the allocated resource, including the application feature of the resource.

An application feature computing unit 66 collects usage information of the resource according to a preset policy, and computes the application feature of the resource according to the usage information of the resource.

In the embodiment of the present disclosure, as the resource demand and the application feature of the resource inputted by the user may have some errors or they are just inputted in a system default mode, or there is no more preferable standby host machine when the resource is allocated to the user, the host machine where the resource allocated to the user is located is not the optimal. Thus, the usage information of the resource is collected according to the preset policy, and the application feature of the resource is computed according to the usage information of the resource, so as to acquire the actual application feature of the resource at present, wherein the usage information of the resource may be hardware usage information. In the implementation process, the method for computing the application feature of the resource may be as follows: if it is concluded that the load is more than 75% in 80% of the time by analyzing the collected usage information of the resource, the application feature of the resource is high CPU usage, and herein the CPU is taken as an example. Similarly, other index values can also be obtained.

A resource adjusting unit 67 performs a resource adjustment according to a preset resource adjustment policy, when the computed application feature is different from the application feature of the resource in the resource allocation request, or the current resource pool has more preferable idle resource.

In the embodiment of the present disclosure, when a resource adjustment triggering condition based on the resource application feature allocation policy is satisfied, the resource adjustment is performed according to the preset resource adjustment policy, wherein 'when a resource adjustment triggering condition based on the resource application feature allocation policy is satisfied' means that the computed application feature is different from the application feature of the resource in the resource allocation request, or the current resource pool has more preferable idle resource. The resource adjustment includes a resource migration and a resource specification adjustment, wherein the resource specification adjustment may be increase and decrease of the memory. In the embodiment of the present disclosure, the resource adjustment policy shall be preset, which includes one or more combinations of a policy for judging whether a migration is allowed, a policy for determining a resource to be migrated, a policy for selecting a target host machine, etc.

The apparatus of the present disclosure is employed for implementing the method embodiment of the present disclosure. Please refer to the description of the method embodiment of the present disclosure for the implementation of the apparatus of the present disclosure, which is omitted herein.

The embodiment of the present disclosure receives a resource allocation request inputted by the user through a client-side, determines the resource specification of a resource and the application feature of the resource, and sends the allocation request that includes the resource specification of the resource and the application feature of the resource to a server. According to a pre-configured resource allocation policy and the application feature of the resource in the resource allocation request, the server controls a host machine where an idle resource is located to allocate the resource, and store the application feature of the allocated resource, then collects usage information of the resource after the resource allocation, computes the application feature of the resource according to the collected usage information of the resource, and performs a resource adjustment in time. The present disclosure solves the problem of degradation of the overall performance of the host machine due to the competition for the resource when multiple applications share the resource, thereby effectively increasing the resource utilization efficiency of the server, reducing the hardware loss, and improving the user's experiences. The above descriptions are just preferred embodiments of the present disclosure, rather than limitations thereto. Any modification, equivalent substitution or improvement made under the spirit and principle of the present disclosure shall fall within the protection scope of the present disclosure.

The invention claimed is:

1. A resource allocation method, implemented by a processor of a resource management platform, the method comprising:

receiving, by the processor, a resource request sent by a resource requester, wherein the resource request comprises resource demand and an application feature of a resource, wherein the resource refers to a Virtual Machine (VM) or a resource having computation capability, the resource demand refers to a performance parameter requirement of the resource requested by the resource requester, and the application feature of the resource refers to a type of an application running on the resource or usage condition of the resource to be applied for by the resource requester;

determining, by the processor, a host machine for allocating resources to the resource requester according to the resource request and a resource application feature allocation policy, wherein the resource application feature allocation policy is a policy used for allocating resource according to the resource application feature;

controlling, by the processor, the host machine to allocate resources to the resource requester and returning resource allocation information about the resources allocated by the host machine to the resource requester;

wherein before the step of determining the host machine for allocating resources to the resource requester according to the resource request and the resource application feature allocation policy, pre-configuring, by the processor, the resource application feature allocation policy, wherein the resource application feature allocation policy is based on one or more of: a resource application feature allocation policy based on region allocation, a resource application feature allocation policy based on host machine allocation, and a resource application feature allocation policy based on a resource application feature combination policy, wherein the resource application feature combination policy being used for defining the application features of the resources capable or incapable of sharing the host machine, or a degree of mutual influence between the resources of two application features which share the host machine;

wherein the step of determining the host machine for allocating resources to the resource requester according to the resource request and the resource application feature allocation policy comprises:

determining an idle resource meeting the resource demand from a resource pool, according to the resource demand and the application feature of the resource in the resource request and the configured resource application feature allocation policy; and determining, when there is any idle resource meeting the resource demand, whether the host machine in which the idle resource is located is the host machine for allocating resources;

wherein the step of determining, when there is any idle resource meeting the resource demand, whether the host machine in which the idle resource is located is the host machine for allocating resources comprises:

if the resource application feature combination policy is not defined in the resource application feature allocation policy, then determining that the host machine in which the idle resource is located is the host machine for allocating resources; and if the resource application feature combination policy is defined in the resource application feature allocation policy, then determining whether an application feature of an allocated resource in the host machine in which the idle resource is located can coexist with the application feature of the resource in the resource request according to the application feature of the allocated resource in the host machine in which the idle resource is located, the application feature of the resource in the resource request and the resource application feature combination policy, and if coexistable, determining that the host machine in which the idle resource is located is the host machine for allocating resources.

2. The method according to claim 1, wherein the step of determining the idle resource meeting the resource demand from the resource pool, according to the resource demand and the application feature of the resource in the resource request and the configured resource application feature allocation policy further comprises:

if the resource demand in the resource request has a region requirement, or a resource providing region is set in a resource authority control policy in the resource pool, or an allocation region is defined by the application feature of the requested resource and the resource application feature allocation policy, then locating in a corresponding region to determine the idle resource meeting the resource demand, according to the resource demand in the resource request and the application feature of the resource, and if the resource demand in the resource request does not have a region requirement, and a resource providing region is not set in a resource authority control policy in the resource pool, and an allocation region is not defined by the application feature of the requested resource and the resource application feature allocation policy, then locating in all resource pools to determine the idle resource meeting the resource demand.

3. The method according to claim 1, wherein the step of if coexistable, determining that the host machine in which the idle resource is located is the host machine for allocating resources comprises:

selecting resources in the host machine in an order from high to low based on the coexistence degrees of resources; and allocating the resources to the resource requester, according to the application feature of the allocated resource in the host machine in which the idle resource is located, the application feature of the resource in the resource request and the resource application feature combination policy.

4. The method according to claim 1, wherein the resource demand of the resource comprises a resource specification, wherein the resource specification is based on one or more of: a position of a host machine where the resource is located, a CPU (Central Processing Unit), a memory, a magnetic disk, a network, an operating system, and an application of the resource; and wherein the application feature of the resource is a type of an application running on the resource, or a usage condition of the resource to be applied for by the resource requester, wherein the usage condition is based on one or more of: a CPU usage rate, a memory usage rate, a magnetic disk read-write, network uplink and downlink, and a Graphic Processing Unit (GPU) usage rate.

5. The method according to claim 1, wherein after controlling the host machine to allocate resources and returning resource allocation information, the method further comprises:

storing information related to allocated resources, wherein the information comprises the application feature of the resources.

6. The method according to claim 1, wherein after the step of controlling the host machine to allocate resources to the resource requester and returning resource allocation information to the resource requester, the method further comprises:

collecting usage information of the resource according to a preset policy; and computing an actual application feature of the resource according to the usage information of the resource.

7. The method according to claim 6, further comprising: when the computed actual application feature is different from the application feature of the resource in the resource request, or a current resource pool has more preferable idle resource, performing a resource adjustment according to a preset resource adjustment policy.

8. A resource management platform, comprising:
a processor and a memory that is coupled to the processor, wherein the processor is configured to:

receive a resource request sent by a resource requester, wherein the resource request comprises resource demand and an application feature of a resource, wherein the resource refers to a Virtual Machine (VM) or a resource having computation capability, the resource demand refers to a performance parameter requirement of the resource requested by the resource requester, and the application feature of the resource refers to a type of an application running on the resource or usage condition of the resource to be applied for by the resource requester;

determine a host machine for allocating resources to the resource requester according to the resource request and a resource application feature allocation policy, wherein the resource application feature allocation policy is a policy used for allocating resource according to the resource application feature;

control the host machine to allocate resources to the resource requester and return resource allocation information about the resources allocated by the host machine to the resource requester;

wherein before determining the host machine for allocating resources to the resource requester according to the resource request and the resource application feature allocation policy, pre-configure the resource application feature allocation policy, wherein the resource application feature allocation policy is based on one or more of: a resource application feature allocation policy based on region allocation, a resource application feature allocation policy based on host machine allocation, and a resource application feature allocation policy based on a resource application feature combination policy, wherein the resource application feature combination policy being used for defining the application features of the resources capable or incapable of sharing the host machine, or a degree of mutual influence between the resources of two application features which share the host machine;

wherein determining the host machine for allocating resources to the resource requester according to the resource request and the resource application feature allocation policy comprises:

determining an idle resource meeting the resource demand from a resource pool, according to the resource demand and the application feature of the resource in the resource request and the configured resource application feature allocation policy; and determining, when there is any idle resource meeting the resource demand, whether the host machine in which the idle resource is located is the host machine for allocating resources;

wherein determining, when there is any idle resource meeting the resource demand, whether the host machine in which the idle resource is located is the host machine for allocating resources comprises:

if the resource application feature combination policy is not defined in the resource application feature allocation policy, then determining that the host machine in which the idle resource is located is the host machine for allocating resources; and if the resource application feature combination policy is defined in the resource application feature allocation policy, then determining whether an application feature of an allocated resource in the host machine in which the idle resource is located can coexist with the application feature of the resource in the resource request according to the application feature of the allocated resource in the host machine in which the idle resource is located, the application feature of the resource in the resource request and the resource application feature combination policy, and if coexistable, determining that the host machine in which the idle resource is located is the host machine for allocating resources.

9. The resource management platform according to claim 8, wherein the resource demand of the resource comprises a resource specification that is based on one or more of: a position of a host machine where the resource is located, a CPU (Central Processing Unit), a memory, a magnetic disk, a network, an operating system, and an application of the resource; and wherein the application feature of the resource is a type of an application running on the resource, or a usage condition of the resource to be applied for by the resource requester, wherein the usage condition is based on one or more of: a CPU usage rate, a memory usage rate, a magnetic disk read-write, network uplink and downlink, and a Graphic Processing Unit (GPU) usage rate.

10. The resource management platform according to claim 8, wherein the processor is further configured to:

store information related to allocated resources, the related information comprising the application feature of the resources.

11. The resource management platform according to claim 8, wherein the processor is further configured to:

collect usage information of the resource according to a preset policy, and compute an application feature of the resource according to the usage information of the resource.

12. The resource management platform according to claim 8, wherein the processor is further configured to:
perform a resource adjustment according to a preset resource adjustment policy, when the computed application feature is different from the application feature of the resource in the resource request, or a current resource pool has more preferable idle resource.

* * * * *